US007726143B2

(12) United States Patent
Marginean et al.

(10) Patent No.: US 7,726,143 B2
(45) Date of Patent: Jun. 1, 2010

(54) VEHICLE COOLED INSTRUMENT PANEL COMPARTMENT

(75) Inventors: Calin Marginean, Lake Orion, MI (US); Richard Kukucka, Ann Arbor, MI (US); Jeffrey I. Godshall, Royal Oak, MI (US); John Jezuit, Oakland, MI (US); Robert Dubiel, Macomb, MI (US); Leon J. Ozark, Jr., Grosse Pointe Woods, MI (US); Ryan C. Nagode, West Bloomfield, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 552 days.

(21) Appl. No.: 11/614,669

(22) Filed: Dec. 21, 2006

(65) Prior Publication Data

US 2008/0148752 A1    Jun. 26, 2008

(51) Int. Cl.
*B60H 1/32* (2006.01)
(52) U.S. Cl. .......................................... 62/244; 454/145
(58) Field of Classification Search ................... 62/244, 62/457.3–457.4; 454/144–146, 284
See application file for complete search history.

(56) References Cited

U.S. PATENT DOCUMENTS

| 2,902,838 | A | * | 9/1959 | Nichols ........................ 62/244 |
| 4,537,118 | A | * | 8/1985 | Lind ........................... 454/284 |
| 5,197,775 | A | * | 3/1993 | Reeber ..................... 296/37.12 |
| 5,203,833 | A | * | 4/1993 | Howell ......................... 165/41 |
| 5,984,774 | A | * | 11/1999 | Upham, III ................. 454/144 |
| 7,073,338 | B2 | * | 7/2006 | Harwood et al. ............. 62/3.61 |
| 7,389,650 | B2 | * | 6/2008 | Kukucka et al. .............. 62/244 |

OTHER PUBLICATIONS

Co-pending U.S. Appl. No. 11/267,690, filed Nov. 4, 2005.

* cited by examiner

*Primary Examiner*—William E Tapolcai
(74) *Attorney, Agent, or Firm*—Ralph E. Smith

(57) ABSTRACT

A glove box assembly for a vehicle is provided and includes a storage bin, a dedicated climate controlled bin, and an air flow manifold. The air flow manifold is arranged to receive cooled air from a vehicle heating ventilation and air conditioning unit and direct the flow of cooled air into the climate controlled bin for cooling the climate controlled bin independent of the storage bin. The air flow manifold is further arranged to draw cooled air from the heating ventilation and air conditioning unit upstream of a blend door when air conditioning is operating so as to provide cooled air to the climate controlled bin independent of a vehicle cabin temperature setting.

18 Claims, 4 Drawing Sheets

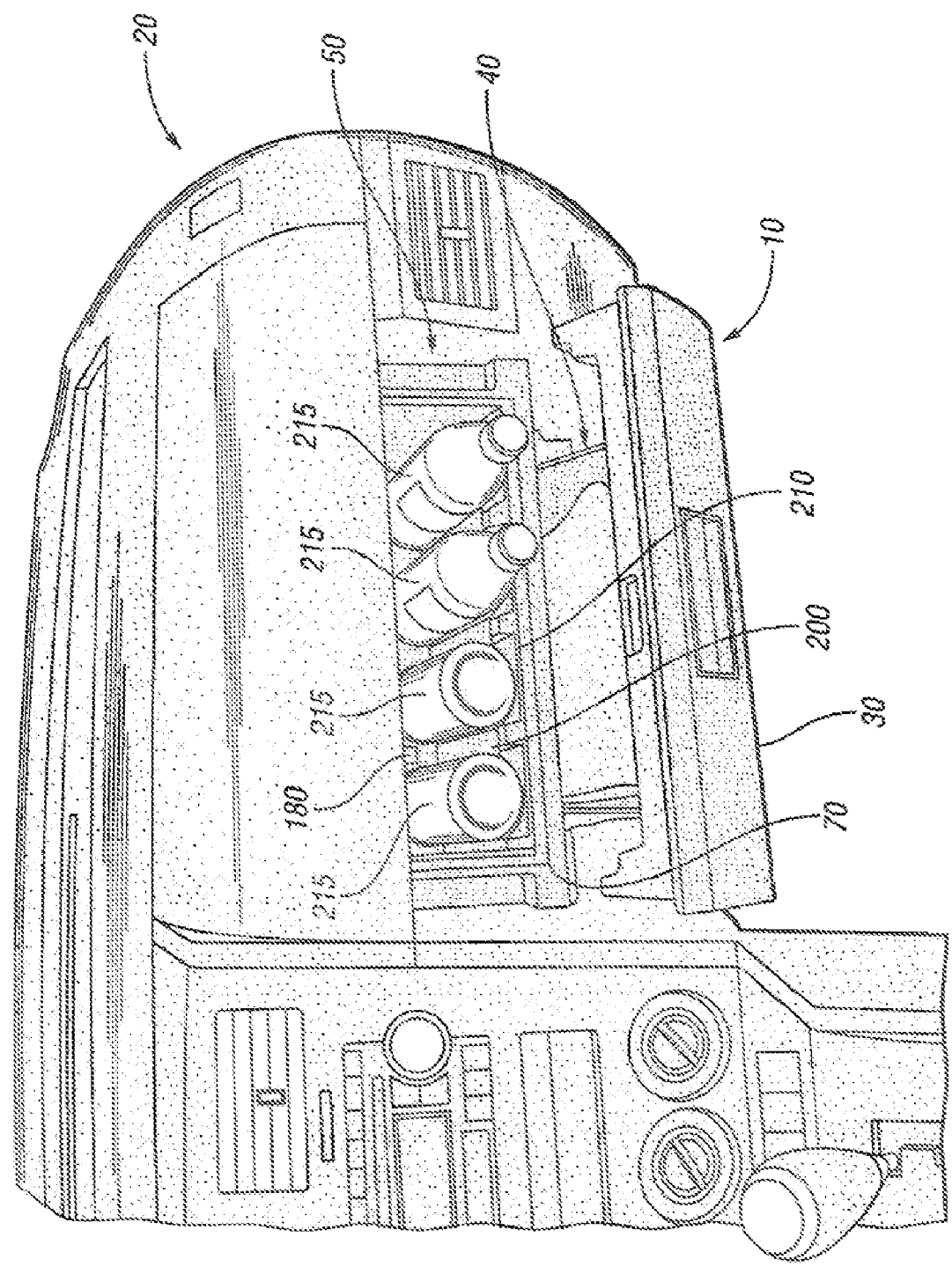

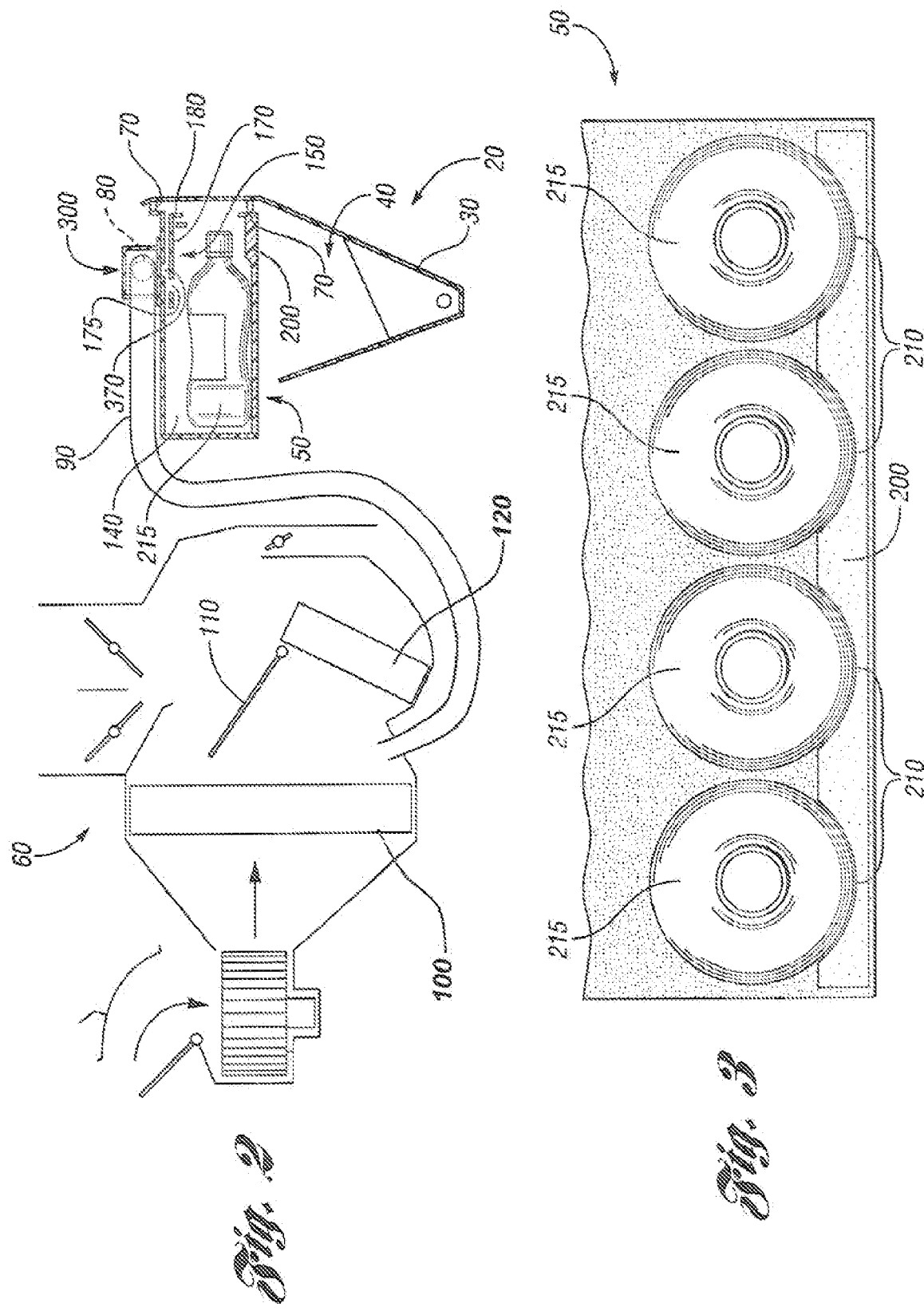

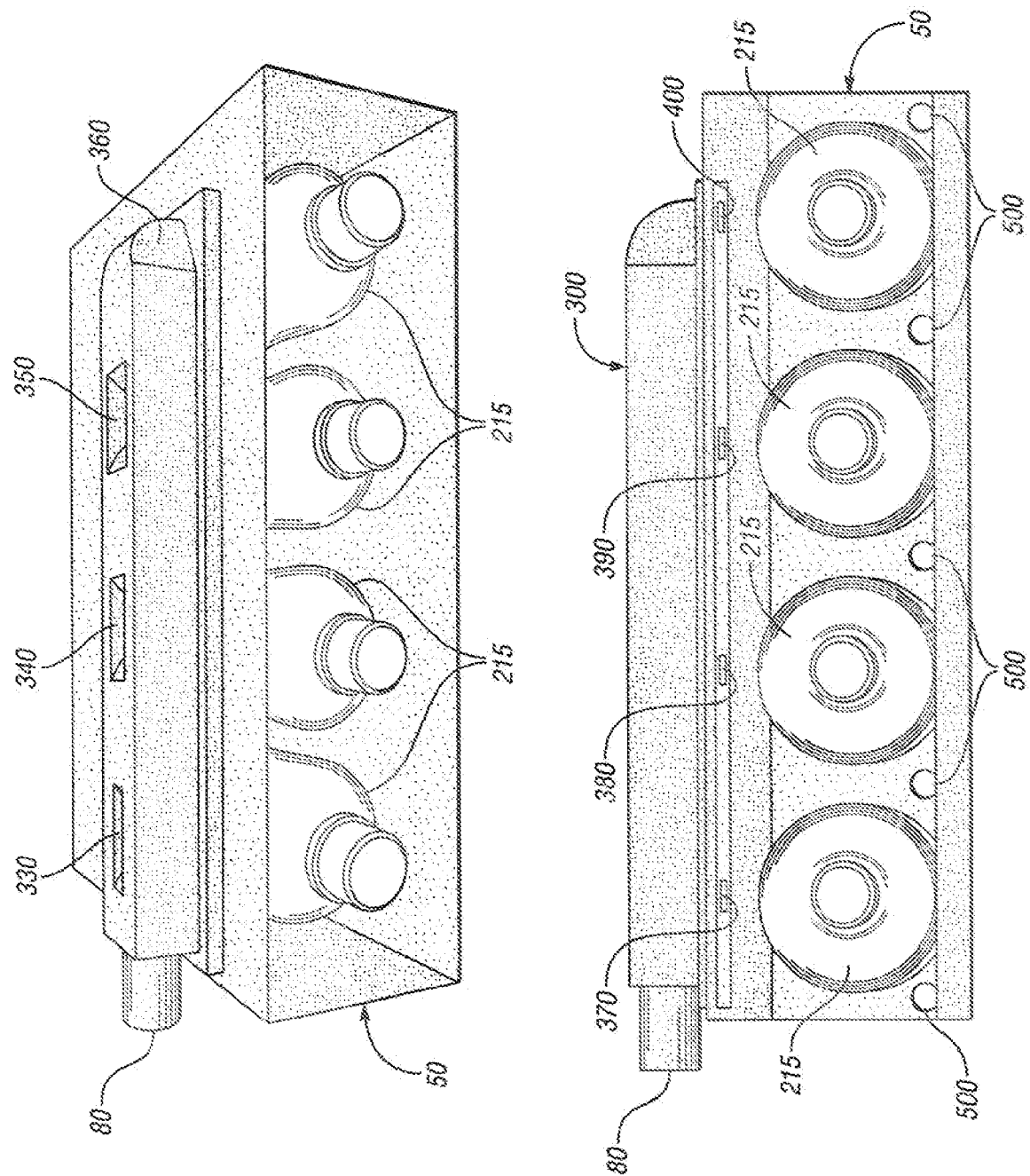

VEHICLE COOLED INSTRUMENT PANEL COMPARTMENT

FIELD OF INVENTION

The present invention relates generally to a cooled instrument panel compartment for a vehicle.

BACKGROUND OF INVENTION

Motor vehicles today are used for many purposes including commuting and trips of long duration. During such trips, for example, vehicle occupants often bring food and chilled beverages for consumption and such beverages are typically placed in various cup holders provided in today's vehicles. One disadvantage of the typical cup holders is that the chilled beverages often warm up to ambient vehicle temperature before or during their consumption. To counteract this disadvantage, a cooler is sometimes used by vehicle occupants to keep their beverages cool before consumption. However, using such a cooler in a vehicle requires, among other things, effort to pack and place the cooler in the vehicle as well as using vehicle interior space that could be used by an occupant or other cargo.

Thus, there is a need for a cooled instrument panel compartment that overcomes the aforementioned and other disadvantages.

SUMMARY OF INVENTION

Accordingly, a cooled instrument panel compartment for a vehicle is provided. In accordance with one aspect of the present invention, a glove box assembly is provided and includes a storage bin, a dedicated climate controlled bin, and an air flow manifold. The air flow manifold is arranged to receive cooled air from a vehicle heating ventilation and air conditioning unit and direct the flow of cooled air into the climate controlled bin for cooling the climate controlled bin independent of the storage bin.

In accordance with another aspect of the present invention, the air flow manifold is arranged to draw cooled air from the heating ventilation and air conditioning unit upstream of a blend door when air conditioning is operating so as to provide cooled air to the climate controlled bin independent of a vehicle cabin temperature setting.

In accordance with yet another aspect of the present invention, the air flow manifold includes a plurality of projections arranged to protrude into an air flow path within the manifold and direct cooled air into the climate controlled bin.

BRIEF DESCRIPTION OF DRAWINGS

Other aspects, features, and advantages of the present invention will become more fully apparent from the following detailed description of the preferred embodiment, the appended claims, and in the accompanying drawings in which:

FIG. 1 illustrates a vehicle glove box assembly having a dedicated climate controlled bin in accordance with the present invention;

FIG. 2 illustrates a simplified partial side view of a heating ventilation and air conditioning assembly interacting with the dedicated climate controlled bin of the glove box assembly in accordance with the present invention;

FIG. 3 illustrates a partial front view of the dedicated climate controlled bin having a removable insert in accordance with the present invention;

FIG. 4 illustrates a partial elevated front view of the dedicated climate controlled bin and air flow manifold in accordance with the present invention;

FIG. 5 illustrates another partial elevated front view of the dedicated climate controlled bin and air flow manifold in accordance with the present invention;

DETAILED DESCRIPTION OF EXEMPLARY EMBODIMENT(S)

Figure 6:
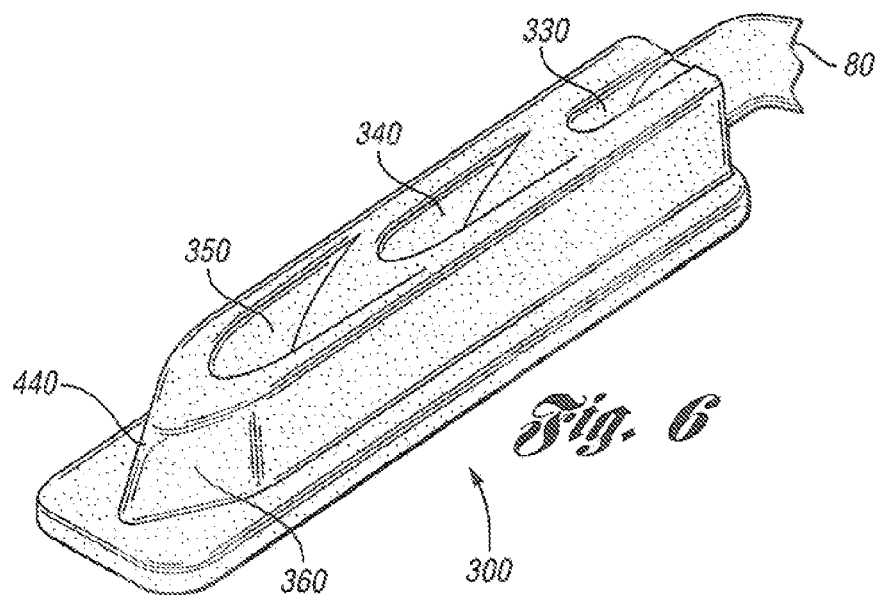
FIG. 6 illustrates a top perspective view of the air flow manifold in accordance with the present invention.
Figure 7:
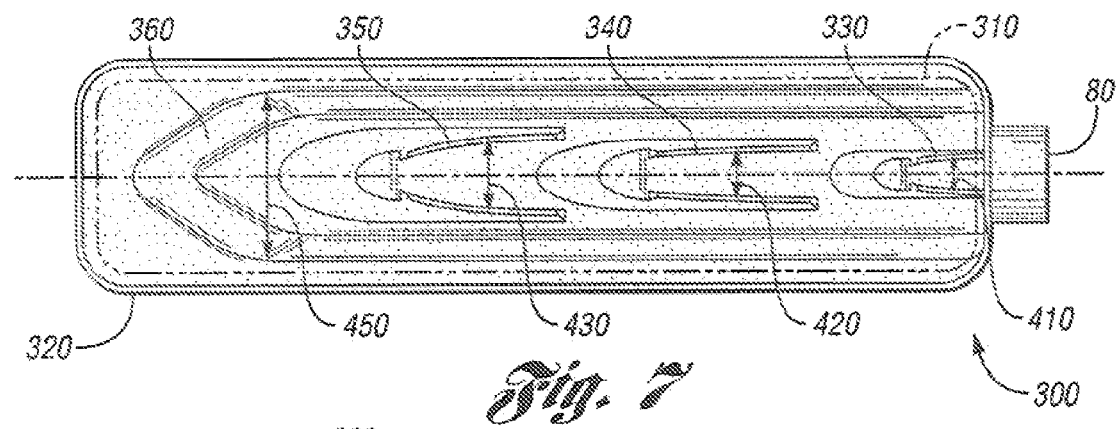
FIG. 7 illustrates a bottom view of the air flow manifold in accordance with the present invention.
Figure 8:
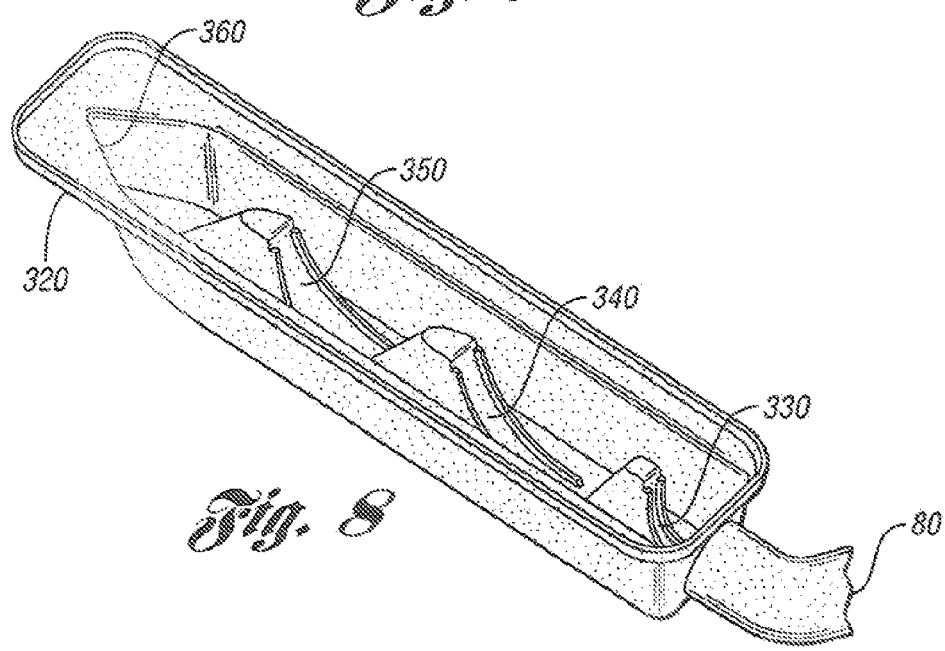
FIG. 8 illustrates a bottom perspective view of the air flow manifold in accordance with the present invention.

In the following description, several well-known features of an instrument panel arrangement and glove box arrangement are not shown or described so as not to obscure the present invention. Referring now to the drawings, FIGS. 1-8 illustrate an exemplary embodiment of a glove box assembly 10 incorporated into an instrument panel module 20 in accordance with the present invention. Glove box assembly 10 includes a door 30 arranged to pivot between a closed position and an open position as best shown in FIGS. 1 and 2. In the open position, door 30 provides access to a storage bin 40 and a dedicated climate controlled bin 50. The climate controlled bin 50 is a separate bin and functions independently from storage bin 40.

The dedicated climate controlled bin 50 has a generally rectangular shape and is arranged to interact with a vehicle heating ventilation and air conditioning (HVAC) system 60 (FIG. 2) to selectively provide cooled air to the climate controlled bin 50 while not cooling the storage bin 40. The climate controlled bin 50 includes a seal 70 positioned on an outer parameter of the bin and arranged to engage door 30 when door 30 is in a closed position. Alternatively, seal 70 could be positioned on door 30 so as to engage the outer perimeter of climate controlled bin 50 when door 30 is in the closed position.

As best shown in FIGS. 2-6, the dedicated climate controlled bin 50 includes an air turning and splitting manifold 300. Manifold 300 includes an air inlet 80 arranged to be connected to a hose 90 that is connected to HVAC system 60. HVAC system 60 is arranged to provide the dedicated climate controlled bin 50 with selective cooled air from HVAC system 60. Hose 90 is connected to HVAC system 60 down stream of an evaporator 100, but upstream of a blend air door 110 so as to provide cooled air to the dedicated climate controlled bin 50 when an air conditioning system is on regardless of a vehicle cabin temperature setting. More specifically, by placing hose 90 upstream of blend air door 110 and thus heater core 120, so long as the air conditioning is on, hose 90 receives cooled air regardless of any warm air from the heater core 120 that is blended via the blend air door 110 to achieve a desired cabin temperature setting.

As best shown in FIGS. 4-8, air inlet 80 directs cooled air into the air turning and splitting manifold 300 that is positioned on a top surface of the dedicated climate controlled bin 50. Manifold 300 includes a seal 310 positioned on a bottom perimeter surface 320 of manifold 300 and seal 310 is arranged to seal manifold 300 to dedicated climate controlled bin 50 so as to prevent air from escaping at an interface between manifold 300 and the top surface of climate controlled bin 50. Air turning manifold 300 includes four sloped projections 330, 340, 350 and 360 for splitting and directing cooled air into dedicated climate controlled bin 50. The sloped projections 330-360 are positioned in a row along a lengthwise centerline of manifold 300.

More specifically, air turning manifold 300 by way of the projections 330-360 is arranged to provide substantially equal flow of cooled air into each of four air inlets 370, 380, 390, 400 that correspond with projections 330-360, respectively. To provide substantially equal flow of cooled air to each of the four air inlets 370-400, each of the projections 330-360 is individually sized and calibrated based on its proximity to air inlet 80 as well as flow characteristics within manifold 300. For example, in the exemplary embodiment, projection 330 is sized to direct approximately twenty-five percent of the air flow entering manifold 300 into air inlet 370 by having a width 410 smaller than a width of the remaining three projections 340-360 as projection 330 is closest to air inlet 80 and is the first projection in the flow stream within manifold 300.

As the remaining approximately seventy-five percent of cooled air in manifold 300 flows around projection 330, the cooled air flow will come into contract with the next projection 340 arranged to direct approximately one third of the remaining air flow into air inlet 380 by having a width 420 that is larger than a width of projection 330, but smaller than subsequent projections 350 and 360. In a similar fashion, projection 350 is arranged to direct one-half of the remaining air flow in manifold 300 into air inlet 390 and it has a width 430 that is larger than projection 340, but smaller than projection 360. Projection 360 forms an enclosure or wall for an end 440 of manifold 300 and is arranged to direct the remaining air flow in manifold 300 into air inlet 400. Projection 360 also has a width 450 that is larger than width 430 of projection 350.

Air inlets 370-400 are positioned in the top surface of climate controlled bin 50 so as to be generally above each of four respective scallops 210 arranged to receive beverage containers 215. Climate controlled bin 50 also includes five exhaust vents 500 positioned in a rear wall 510 of bin 50. Exhaust vents 500 are positioned on each side of scallops 210 and are arranged to vent the dedicated climate controlled bin 50 as well as promote an air flow path around each of the four beverage containers 215 starting from air inlets 370-400 above containers 215 and then flowing around containers 215 and out exhaust vents 500.

Climate controlled bin 50 also includes an internal, adjustable air venting arrangement 150. The internal venting arrangement 150 includes a translatable perforated panel 170 having perforations 175 arranged to cooperate with air inlets 370-400 to control flow of cooled air into climate controlled bin 50. More specifically, translatable panel 170 is arranged to slide so as to align perforations 175 with each of the four air inlets 370-400, respectively, so as to allow cooled air into lower portion 140 and thus cool any contents of the dedicated climate controlled bin 50, or to have the perforations 175 of translatable panel 170 not align with air inlets 370-400 so as to block off cooled air from air turning manifold 300 and not cool the dedicated climate controlled bin 50. A vehicle operator can translate panel 170 via a handle arrangement such as handle 180 shown in FIGS. 1 and 2.

The climate controlled bin 50 also includes a removable insert 200. Removable insert 200 can comprise many configurations depending on what type of contents are desired to be cooled in the climate controlled bin. In this exemplary embodiment, removable insert 200 includes four scallops 210 arranged to receive beverage containers 215 and prevent the containers from rolling in the dedicated climate controlled bin 50 as best shown in FIG. 3. Scallops 210 are sized such that typical beverage containers such as a 12 ounce can or a 20 ounce plastic bottle are held in place and up to four of either container can be easily placed and cooled in the dedicated climate controlled bin 50.

In operation, the dedicated climate controlled bin effectively provides a built in cooler for a vehicle that is incorporated into a glove box assembly while remaining independent from a storage area of the glove box assembly. With the dedicated climate controlled bin, a vehicle occupant can continue to use the storage area of the glove box while also being able to selectively cool desired items in a separate bin independent from the glove box storage area which will not receive the cooled air.

The vehicle occupant can also cool desired items in the dedicated climate controlled bin with the AC on regardless of a desired vehicle cabin temperature. Thus, even if a vehicle occupant selects a cabin temperature that requires blending warm air with air conditioned air, the dedicated climate controlled bin will only receive cooled air from the HVAC unit because the dedicated climate controlled bin receives the cooled air from upstream of the blend air door.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A glove box assembly for a vehicle, the glove box assembly comprising:
   a dedicated climate controlled bin;
   an air flow manifold;
   wherein the air flow manifold is arranged to receive cooled air from a vehicle heating ventilation and air conditioning unit and direct the flow of cooled air into the climate controlled bin providing cooling of the climate controlled bin; and
   wherein the air flow manifold has an inlet through which cooled air flow from the vehicle heating ventilation and air conditioning unit is received and comprising a plurality of flow directing projections downstream of the inlet and spaced apart along an air flow path within the manifold that are each arranged to protrude into the air flow path within the manifold and that increase in size the farther disposed from the air inlet in a manner that directs substantially the same amount of flow of cooled air through each one of a corresponding plurality of spaced apart air inlets into the climate controlled bin.

2. The glove box assembly of claim 1, wherein the air flow manifold is arranged to draw cooled air from the heating ventilation and air conditioning unit downstream of an evaporator and upstream of a heater core and a blend door that controls air flow through the heater core so as to provide cooled air to the climate controlled bin independent of a vehicle cabin temperature setting.

3. The glove box assembly of claim 1, wherein the plurality of projections comprises four projections and wherein the climate controlled bin comprises four air inlets arranged in fluid communication with the four projections, the four projections arranged to direct cooled air into the climate controlled bin through the four air inlets.

4. The glove box assembly of claim 1, wherein the dedicated climate controlled bin further comprises an adjustable air venting arrangement comprised of a translatable panel that is movable between one position that blocks each one of the plurality of air inlets in air flow communication with the climate controlled bin and another position that completely unblocks each one of the plurality air inlets in air flow communication with the climate controlled bin.

5. The glove box assembly of claim 3, wherein each of the four projections are dimensioned such that each projection directs a substantially equal amount of air into each of the four air inlets of the climate controlled bin.

6. The glove box assembly of claim 1, wherein the air flow manifold comprises a lengthwise centerline, wherein the plurality of air flow direction projections are formed therein and positioned in a row along the centerline, and wherein each projection includes a width, the width of one projection positioned closest to the air inlet being smaller than another projection spaced farther away, the width of the another projection being smaller than a width of a further projection located distal of the air inlet such that each projection directs a substantially equal amount of air into the climate controlled bin.

7. The glove box assembly of claim 5, further comprising a removable insert having four scallops and arranged to be positioned in the climate controlled bin, each scallop arranged to support a beverage container and prevent the container from rolling during vehicle operation, and wherein the climate controlled bin further comprises five exhaust vents, each vent positioned in a rear wall of the climate controlled bin such that the vents are positioned below the four air inlets and on each side of the beverage container placed in each scallop.

8. The glove box assembly of claim 1, further comprising a removable insert having four scallops and arranged to be positioned in the climate controlled bin, each scallop arranged to support a beverage container and prevent the container from rolling during vehicle operation.

9. The glove box assembly of claim 1, further comprising a door carrying a storage bin and arranged to pivot relative to the climate controlled bin between an open position and a closed position, wherein the open position is arranged to provide access to the storage bin and the climate controlled bin and the closed position is arranged to provide closure for the storage bin and climate controlled bin, and wherein the glove box assembly further comprises a seal arranged to provide a thermal barrier for cooled air contained within an enclosed volume of the climate controlled bin.

10. An instrument panel module for a vehicle, the instrument panel module comprising:
a glove box assembly, the glove box assembly including:
a dedicated climate controlled bin;
wherein the air flow manifold is arranged to receive cooled air from a vehicle heating ventilation and air conditioning unit and direct the flow of cooled air into the climate controlled bin, cooling the climate controlled bin independent of a vehicle cabin temperature setting;
wherein the air flow manifold is elongate and extends longitudinally relative to the dedicated climate controlled bin with the manifold having a cooled air inlet at one end; and
wherein the manifold includes a plurality of air flow directing projections arranged to protrude into an air flow path within the manifold and direct cooled air into the climate controlled bin through a plurality of air inlets positioned in a top portion of the climate controlled bin and arranged in fluid communication with a corresponding one of the air flow directing projections.

11. The instrument panel module of claim 10, wherein the air flow manifold is arranged to draw cooled air from the heating ventilation and air conditioning unit upstream of a heater core, upstream of a blend door used to control air flow through the heater core, and downstream of an evaporator when air conditioning is operating so as to provide cooled air to the climate controlled bin independent of a vehicle cabin temperature setting.

12. The instrument panel module of claim 10, wherein each of the plurality of air flow directing projections extend downwardly from a wall of the manifold toward a corresponding one of the air inlets in the top portion of the climate controlled bin, are generally in line with one another, and are dimensioned to have a size that increases the farther the air flow directing projection is spaced from the manifold cooled air inlet so as to direct a substantially equal amount of air into each of the plurality of air inlets of the climate, controlled bin.

13. The glove box assembly of claim 10, further comprising a removable insert having a plurality of spaced apart scallops and arranged to be positioned in the climate controlled bin, each scallop arranged to support a beverage container and prevent the container from rolling during vehicle operation, and wherein the climate controlled bin further comprises a plurality exhaust vents, each vent positioned in a rear wall of the climate controlled bin such that the vents are positioned below the plurality of air inlets and on each side of a beverage container placed in each scallop.

14. The glove box assembly of claim 10, further comprising a storage bin comprised of a door arranged to pivot relative to the climate controlled bin between an open position and a closed position, wherein the open position is arranged to provide access to the storage bin and the climate controlled bin and the closed position is arranged to provide closure for the storage bin and climate controlled bin, and wherein the glove box assembly further comprises a seal arranged to provide a thermal barrier for cooled air contained within an enclosed volume of the climate controlled bin.

15. A vehicle, the vehicle comprising:
a glove box assembly, the glove box assembly including:
a dedicated climate controlled bin;
an air flow manifold;
wherein the air flow manifold is arranged to receive cooled air from a vehicle heating ventilation and air conditioning unit and direct the flow of cooled air cooling the climate controlled bin; and
wherein the air flow manifold is arranged to receive cooled air from the heating ventilation and air conditioning unit (a) upstream of a heater core and upstream of a blend door that controls air flow through the heater core, and (b) downstream of an evaporator providing cooled air that cools the climate controlled bin independent of a vehicle cabin temperature setting.

16. The vehicle of claim 15, wherein the air flow manifold includes a plurality of spaced apart air flow directing projections arranged to protrude into an air flow path within the manifold and direct cooled air into the climate controlled bin though a corresponding number of air inlets positioned in a top surface of the climate controlled bin and arranged in fluid communication with a respective one of the plurality of air flow directing projections, and wherein each of the plurality of air flow directing projections are dimensioned having a plurality of different sizes such that each projection directs a substantially equal amount of cooled air into each of the air inlets of the climate controlled bin.

17. The vehicle of claim 16, wherein the glove box assembly further includes a removable insert having four scallops and arranged to be positioned in the climate controlled bin, each scallop arranged to support a beverage container and prevent the container from rolling during vehicle operation, and wherein the climate controlled bin further comprises a plurality of exhaust vents, each vent positioned in a rear wall of the climate controlled bin such that the vents are positioned below the air inlets and on each side of a beverage container placed in each scallop.

18. The vehicle of claim 15, wherein the glove box assembly further includes a storage bin having a portion defining a door arranged to pivot relative to the climate controlled bin between an open position and a closed position, wherein the open position is arranged to provide access to the storage bin and the climate controlled bin and the closed position is arranged to provide closure for the storage bin and climate controlled bin.

* * * * *